United States Patent Office 2,781,942
Patented Feb. 19, 1957

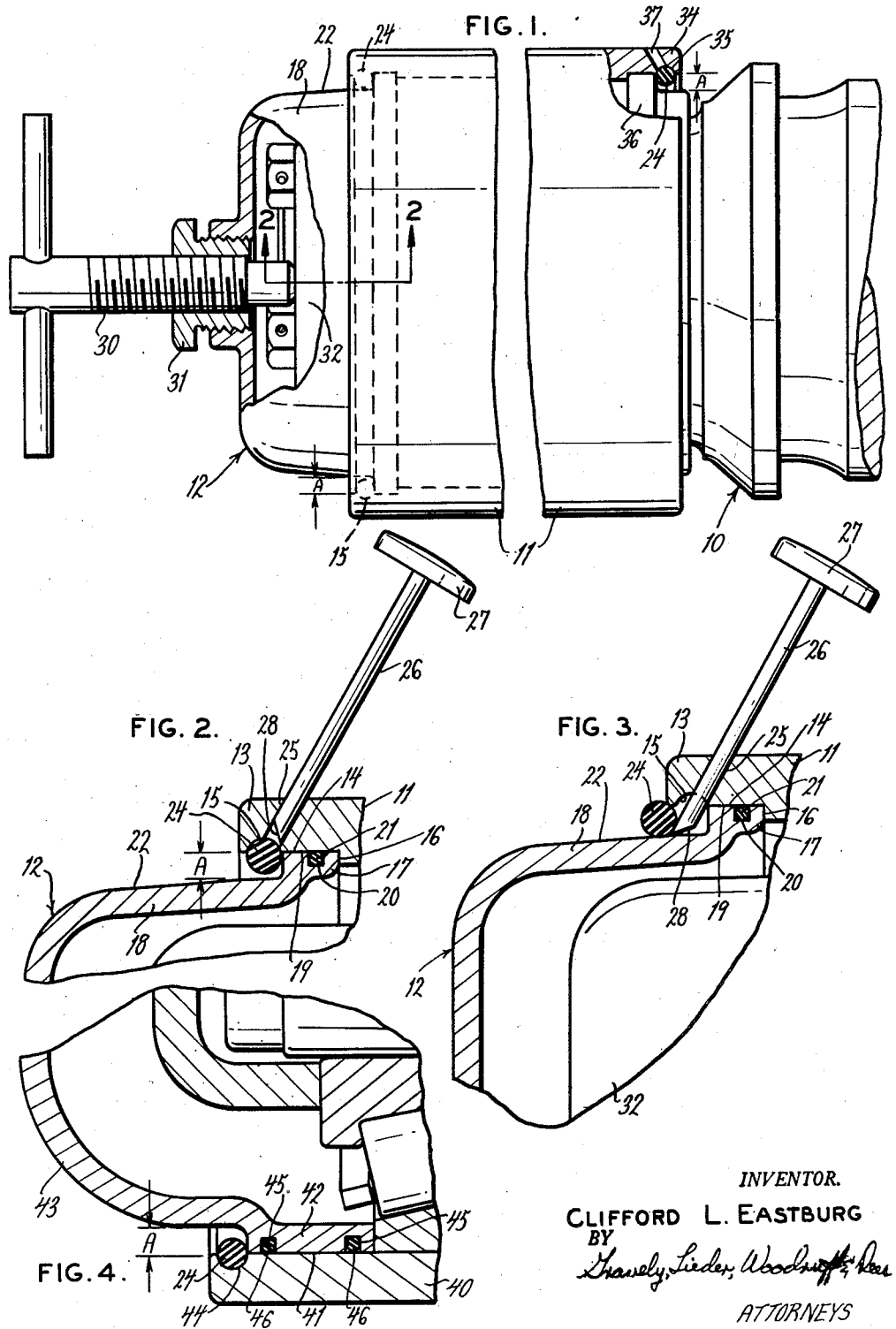

2,781,942

SEALED JOINT

Clifford L. Eastburg, Canton, Ohio, assignor to The Timken Roller Bearing Company, Canton, Ohio, a corporation of Ohio Application April 22, 1953, Serial No. 350,395

1 Claim. (Cl. 220—46)

This invention relates to a joint and to the parts for joining and sealing a cover in place on a bearing housing in particular.

The broad object of the invention is to provide a novel joint and means which cooperate with the parts to be joined for the purpose of holding such parts in place.

Another object is to provide a novel joint having means for sealing the joint as well as retaining the parts of the joint in association.

A further object is to provide pliable means for both joining and sealing a joint between two parts, as a bearing housing and cover, such that the parts may be easily put together or separated.

The invention is illustrated in connection with the mounting of a cover on a bearing housing and the preferred form thereof includes an inner surface on one part with a recess in the face of such surface, a flange having an outer mating surface on the other part to be connected or mounted to the first part, and a pliable member snugly fitted into the recess in position adjacent the flange to hold the parts and effect a sealed joint therebetween. The invention further consists in the application to a joint of a pliable or deformable member which requires some deformation or compression to place it in position in a joint between two parts and also requires some force applied to a localized zone for effecting its removal.

In the drawing:

Fig. 1 is an assembly view of a cover and bearing housing for an axle journal in which the present invention is embodied;

Fig. 2 is an enlarged fragmentary sectional view of the cover and housing joint, the view being taken at line 2—2 in Fig. 1;

Fig. 3 is similar to Fig. 2 in that a dislodging tool is shown, but the tool has been moved to illustrate how the pliable or deformable member may be dislodged; and, Fig. 4 is an enlarged fragmentary sectional view of another form of joint.

In the drawing, the axle 10 has its journal portion in a suitable bearing housing 11, and a cover 12 is disposed at the outermost end of the housing by means of the joint hereinafter to be described. The housing 11 (Fig. 2) or one part of the joint is formed at one end with a lip 13 having the inner surface 14 with the undercut recess 15 therein. A shoulder 16 is provided to define the interior limit of the surface 14. Recess 15 forms a seating surface to be described.

The cover 12 or other part of the joint is formed with a flange 17 on the extremity of the wall 18 thereof. The flange is provided with an outer surface 19 mating with the surface 14 on the lip 13 of part 11, and this surface 19 has a recess 20 therein to receive a fluid seal element 21 of O ring type. The wall 18 outwardly or spaced from the flange 17 is slightly tapered as at portion 22, although the provision of this taper is not essential for in certain assemblies (Fig. 4) the wall may not be sufficient to allow for taper.

The joint retaining member 24 (Fig. 2) is formed as an O ring and may be made from any suitable synthetic rubber or pliable materials which can be slightly compressed. Member 24 is snugly fitted into the seating surface or recess 15 after the parts 11 and 12 are placed in position. The outside diameter or circumferential length of the member 24 is made larger than the seating surface of recess 15 so that it will snap into place with a slight compression. This action will tend to hold the member in place and force it into a desired seated condition in the recess. Also, member 24 has a diameter or thickness, in section, which is slightly larger than the width of gap or space A between the base of wall portion 18 on part 12 and the surface 14 of the lip 13 on part 11. This last mentioned feature, together with its slight oversized relation with respect to recess 15, contributes to the member 24 functioning as a seal to prevent leakage through the joint and as a locking or retaining member to secure the joint between the parts 11 and 12.

In Figs. 2 and 3, means is shown for removing member 24 to effect separation of parts 11 and 12. As shown, lip 13 of part 11 has an aperture 25 directed at an angle to and opening into the seating surface or recess 15 at the inner side thereof. A suitable tool 26 having the T handle 27 is inserted in the aperture 25 with its angular dislodging face 28 in the position of Fig. 2. The initial effect of tool face 28 is to deform the member 24 in the local area of the aperture 25 and force the same partly outwardly of the gap between the parts 11 and 12. Since the width dimension of gap A is somewhat less than the section diameter or thickness of member 24, the member will be frictionally held. The tool 26 is then rotated and face 28 turned 180 degrees so that the point may force the member 24 outwardly of this gap where it can be grasped and fully removed from the recess 15, thus unlocking parts 11 and 12. The sealing ring 21 offers only slight frictional resistance to removal of part 12 when the pulling screw or thrust tool 30 (Fig. 1) threadedly mounted in the bushing 31 in part 12 is turned. Tool 30 pushes against the relatively fixed means 32 and the part 12 is thereby caused to slip outwardly of the lip 13 on part 11.

In Fig. 1, the present joint may be formed at the innermost end of housing or part 11. This joint comprises the lip 34 having the seating surface or recess 35 in the inner surface adjacent the position of a rubbing seal assembly 36 which encloses this end of housing 11. The joint locking member 24 of section diameter or thickness larger than the dimension of gap A is compressively snapped into recess 35 to lock the parts 11 and 36 in position. Removal of member 24 is effected by the tool 26 inserted in angular aperture 37 in lip 34 as previously described in Figs. 2 and 3.

In Fig. 4, part 40 has the inner surface 41 adapted to receive the flange 42 of part 43. Surface 41 is provided with seating surface or recess 44 which receives the locking member 24 for holding and sealing the joint between parts 40 and 43 in the same manner as described before. The dimension of gap A is less than the section diameter or thickness of member 24. While member 24 effects locking of these parts and also seals the joint, the flange 42 having an elongated bearing contact on surface 41 is provided with a plurality of recesses 45, each receiving a sealing O ring 46 for further sealing the joint.

In each of the described joints, the locking member 24 is capable of withstanding vibrational shock between the parts in the zone of the joint, and will cushion substantial axial forces tending to break or separate the joint. Also the spaced locations of the member 24 and the additional sealing ring 21 or rings 46 will eliminate possible development of a fulcrum point for angular disturbances in the joint. Where axial forces on the joint are low or unimportant it is possible to dispense with the tool 26 and rely upon a shallow recess for member 24 and a pulling screw of the type shown at 30 in Fig. 1 to dislodge member 24 by causing the flange on the one part of the joint to deform the member and force it to roll out of the shallow recess in the other part.

The present invention has been shown and described in certain preferred embodiments thereof, but it should be clear that modifications may be made therein and it is the aim to include such modifications in the following claim.

What is claimed is:

A sealing and locking joint assembly comprising a generally cylindrical housing having a substantially squared end face and having a counterbore in such end providing a cylindrical interior surface extending inwardly from said end face and terminating in an inwardly stepped shoulder extending perpendicular thereto, and there being a continuous, annular groove of semicircular cross-section provided in such surface adjacent to said end face, a generally cylindrical cover member having a closed end and having its open end provided with a radially outwardly projecting flange having a cylindrical outer surface snugly received within said end of the housing with the end face of said flange engaged against said shoulder, the outer edge of said flange being disposed substantially perpendicular to said interior surface of said housing and in tangential relation to said semicircular groove at the innermost edge thereof, and the exterior of said cover adjacent said flange defining a gap with said inner surface of the housing, an annular, compressible locking ring of circular radial cross-section received within said groove, said locking ring normally being of greater radial thickness, when unstressed, than the radial width of said gap and projecting partially across said gap, said locking ring being force fitted within said groove and having a peripheral length, when unstressed, greater than the greatest length of said groove so that when seated in said groove, the locking ring engages against said outer edge of said flange along a line substantially coincident with said inner edge of the groove whereby said flange sealingly engages said locking ring and locks said cover within the housing, and there being a circular bore through said housing intersecting said groove to permit the insertion of a tool therethrough for removal of the locking ring, said bore being inclined to the longitudinal axis of said housing with its outer opening being spaced farther from said end face of the housing than is the inner opening thereof.

References Cited in the file of this patent

UNITED STATES PATENTS

| | | |
|---|---|---|
| 323,153 | Ives | July 28, 1885 |
| 1,117,856 | Kent | Nov. 17, 1914 |
| 1,360,829 | Tunnell | Nov. 30, 1920 |
| 1,713,224 | Gunter | May 14, 1929 |
| 2,281,145 | Duey | Apr. 28, 1942 |
| 2,288,412 | McDermott | June 30, 1942 |
| 2,401,856 | Brock | June 11, 1946 |
| 2,436,407 | Stephens | Feb. 24, 1948 |
| 2,492,006 | Raybould | Dec. 20, 1949 |
| 2,578,389 | Andersson | Dec. 11, 1951 |
| 2,583,873 | Nichols | Jan. 29, 1952 |

FOREIGN PATENTS

| | | |
|---|---|---|
| 498,108 | Canada | Dec. 1, 1953 |